United States Patent
Stunnebrink et al.

(10) Patent No.: US 12,146,346 B2
(45) Date of Patent: Nov. 19, 2024

(54) ATTACK-RESISTANT RING LOCK

(71) Applicant: Schlage Lock Company LLC, Carmel, IN (US)

(72) Inventors: Marco Stunnebrink, Horssen (NL); Ilias Baiazitov, Utrecht (NL); Jan Gerbrand Hutten, Veenendaal (NL)

(73) Assignee: Schlage Lock Company LLC, Carmel, IN (US)

( * ) Notice: Subject to any disclaimer, the term of this patent is extended or adjusted under 35 U.S.C. 154(b) by 188 days.

(21) Appl. No.: 17/951,609

(22) Filed: Sep. 23, 2022

(65) Prior Publication Data

US 2024/0102321 A1    Mar. 28, 2024

(51) Int. Cl.
| | |
|---|---|
| E05B 67/38 | (2006.01) |
| E05B 67/02 | (2006.01) |
| E05B 67/24 | (2006.01) |
| E05B 67/28 | (2006.01) |

(52) U.S. Cl.
CPC .............. *E05B 67/38* (2013.01); *E05B 67/02* (2013.01); *E05B 67/24* (2013.01); *E05B 67/28* (2013.01)

(58) Field of Classification Search
CPC .......... E05B 67/00; E05B 67/02; E05B 67/22; E05B 67/24; E05B 67/26; E05B 67/28; E05B 67/38; E05B 67/383
USPC ............................................................ 70/52
See application file for complete search history.

(56) References Cited

U.S. PATENT DOCUMENTS

| | | | |
|---|---|---|---|
| 2,855,028 A | 10/1958 | Matthews | |
| 2,921,353 A | 1/1960 | Cushman | |
| 4,543,806 A | 10/1985 | Papandrea et al. | |
| 4,635,782 A | 1/1987 | Wieth et al. | |
| 5,197,310 A * | 3/1993 | Pedersen | B62H 5/147 70/227 |
| 5,802,889 A * | 9/1998 | Arnold | B62H 5/14 211/5 |
| 8,854,207 B2 | 10/2014 | Williams | |
| 9,512,649 B2 * | 12/2016 | Mohamed | E05B 47/0012 |
| 9,669,888 B1 | 6/2017 | Singleton | |

(Continued)

FOREIGN PATENT DOCUMENTS

| | | |
|---|---|---|
| CN | 108691459 A | 10/2018 |
| DE | 69001894 T2 | 11/1993 |
| DE | 3543201 C2 | 1/1995 |

(Continued)

OTHER PUBLICATIONS

EP-2962920-A1, Hutten (Year: 2016).*

(Continued)

*Primary Examiner* — Nathan Cumar

(74) *Attorney, Agent, or Firm* — Taft Stettinius & Hollister LLP

(57) ABSTRACT

An exemplary ring lock generally includes a case, a shackle, and a lock mechanism. The shackle is movably mounted to the case. The lock mechanism is operable to selectively retain the shackle in a closed position. The case includes a first case portion including a first flange, and a second case portion including a second flange. In certain forms, the first flange and the second flange are welded to one another. In certain forms, the first flange and/or the second flange has a depth of one centimeter or less. In certain forms, the case includes at least one ramp configured to discourage gripping of the case.

20 Claims, 4 Drawing Sheets

(56) References Cited

U.S. PATENT DOCUMENTS

| | | |
|---|---|---|
| 9,976,321 B2 | 5/2018 | Chen |
| 2020/0361552 A1 | 11/2020 | Radenbaugh et al. |

FOREIGN PATENT DOCUMENTS

| | | | |
|---|---|---|---|
| DE | 10240558 B4 | 4/2010 | |
| DE | 10240570 B4 | 4/2010 | |
| DE | 102010008054 A1 | 8/2011 | |
| DE | 102012102896 A1 | 10/2013 | |
| DE | 202015104232 U1 | 9/2015 | |
| DE | 202015104618 U1 | 10/2015 | |
| DE | 202015105949 U1 | 12/2015 | |
| DE | 202016101782 U1 | 6/2016 | |
| DE | 102018006576 A1 | 2/2020 | |
| DE | 202020106957 U1 | 1/2021 | |
| EP | 728659 B1 | 5/1999 | |
| EP | 1418302 B1 | 8/2005 | |
| EP | 1834864 A1 * | 9/2007 | B62H 5/003 |
| EP | 1416110 B1 | 5/2008 | |
| EP | 1717135 B1 | 2/2009 | |
| EP | 2842847 B1 | 10/2015 | |
| EP | 2962919 A1 | 1/2016 | |
| EP | 2962920 A1 | 1/2016 | |
| EP | 2842846 B1 | 4/2016 | |
| EP | 3064419 B1 | 6/2018 | |
| EP | 3566933 A1 | 11/2019 | |
| NL | 2000149 C2 | 1/2008 | |
| NL | 2004606 A | 6/2011 | |
| NL | 2022574 B1 | 8/2020 | |
| WO | 2014089919 A1 | 6/2014 | |
| WO | 2021038059 A1 | 3/2021 | |

OTHER PUBLICATIONS

EP-1834864-A1, Muerza (Year: 2007).*
Extended European Search Report, European Patent Office, European Patent Application No. 23199501.0, Mar. 15, 2024, 7 pages.

* cited by examiner

ATTACK-RESISTANT RING LOCK

TECHNICAL FIELD

The present disclosure generally relates to portable lock apparatuses with attack-resistant features, and more particularly but not exclusively relates to ring locks including attack-resistant features.

BACKGROUND

Portable lock apparatuses are often used to prevent theft of a portable object, such as a bicycle. One form of portable lock apparatus that is gaining popularity is the ring lock. A ring lock is typically secured to the frame of a bicycle adjacent one of the wheels such that the lock is operable to enclose a portion of the wheel when the ring lock is in its closed condition. In this state, the shackle interferes with the spokes and prevents the wheel from rotating, thereby discouraging a would-be thief from riding the bicycle or other wheeled transport. Many existing ring locks suffer from certain drawbacks and limitations, such as those relating to susceptibility to peeling attacks. For these reasons among others, there remains a need for further improvements in this technological field.

SUMMARY

An exemplary ring lock generally includes a case, a shackle, and a lock mechanism. The shackle is movably mounted to the case. The lock mechanism is operable to selectively retain the shackle in a closed position. The case includes a first case portion including a first flange, and a second case portion including a second flange. In certain forms, the first flange and the second flange are welded to one another. In certain forms, the first flange and/or the second flange has a depth of one centimeter or less. In certain forms, the case includes at least one ramp configured to discourage gripping of the case. Further embodiments, forms, features, and aspects of the present application shall become apparent from the description and figures provided herewith.

DETAILED DESCRIPTION OF ILLUSTRATIVE EMBODIMENTS

Figure 1:
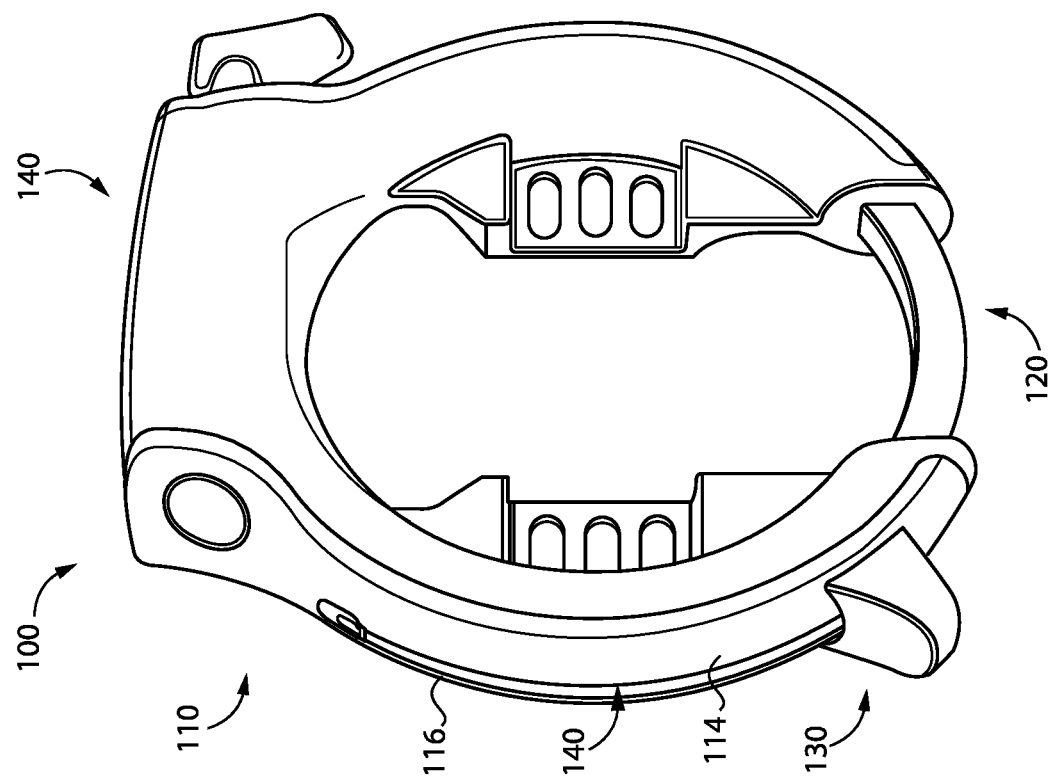
FIG. 1 is a perspective illustration of a ring lock according to certain embodiments in an open configuration.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

Figure 2:
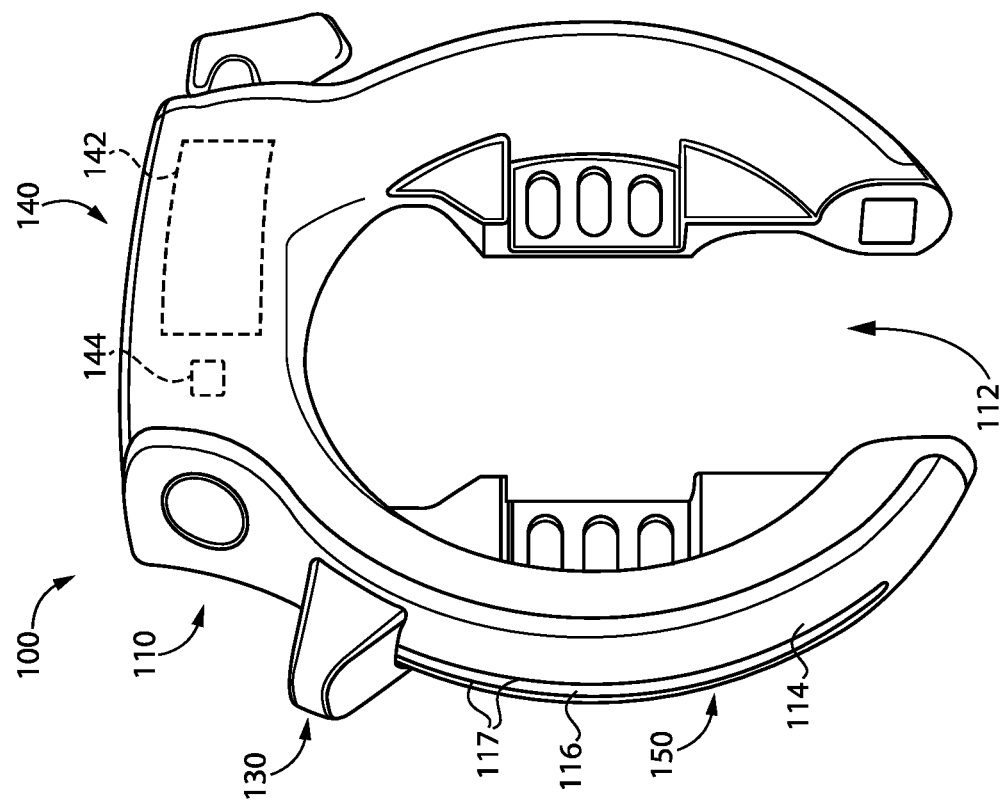
FIG. 2 is a perspective illustration of the ring lock while in a closed configuration.

With reference to FIGS. 1 and 2, illustrated therein is a ring lock 100 according to certain embodiments. The ring lock 100 generally includes a housing 110, a shackle 120 movably mounted in the housing 110, a driver 130 operable to move the shackle 120 between an open position (FIG. 1) and a closed positon (FIG. 2), and a lock mechanism 140 operable to selectively retain the shackle 120 in the closed position.

The housing 110 encloses one or more other components of the ring lock 100, and provides a base to which one or more components of the ring lock 100 may be mounted. In the illustrated form, the housing 110 is configured for mounting to a wheeled transportation device (e.g., a bicycle or motorcycle) adjacent a wheel of the transportation device, and includes a gap 112 operable to receive a portion of the wheel of the transportation device. As described herein, the housing 110 includes an outer housing 114 and a case 150 mounted within the outer housing 114. The outer housing 114 defines an arcuate guide path 116 along which a knob 132 of the driver 130 travels during opening and closing of the ring lock 100. Positioned on opposite sides of the guide path 116 are a pair of lips 117 that facilitate the guiding of the knob 132 along the guide path 116. A portion of the case 150 is visible via the guide path 116.

Figure 3:
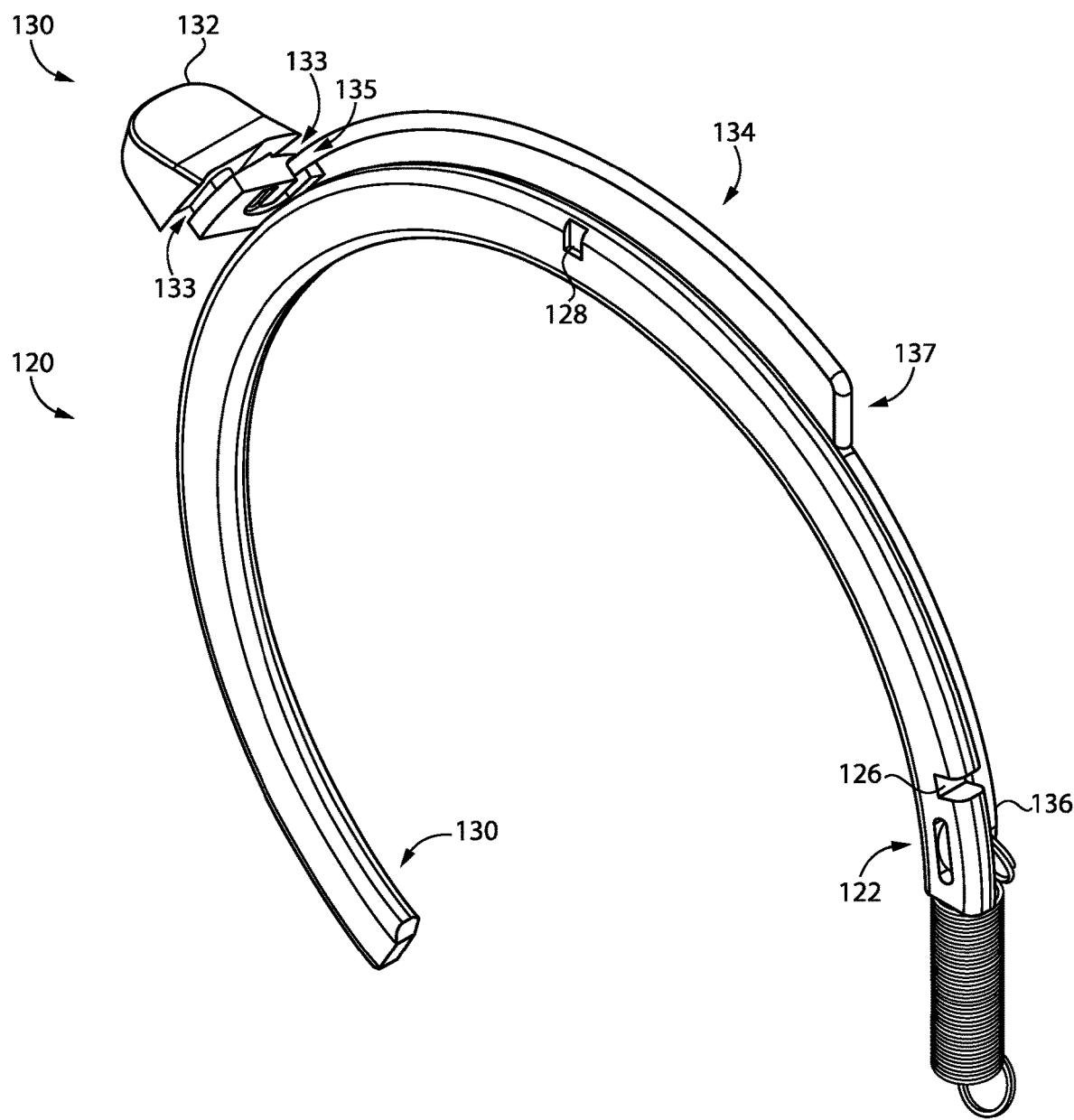
FIG. 3 is a perspective illustration of a portion of the ring lock, including a shackle and an actuator.

With additional reference to FIG. 3, the shackle 120 is generally arcuate, and is mounted for movement relative to the housing 110 between an open position and a closed position. The shackle 120 includes a rear end portion 122 that remains within the housing 110, and a front end portion 124 that crosses the gap 112 and enters an opening 118 of the housing 110 during closing of the shackle 120. With the shackle 120 in the closed position, a portion of the wheel of the transportation device is captured within the enclosed opening 112, and the shackle 120 interferes with spokes of the wheel to prevent rotation of the wheel relative to the frame. When the shackle 120 is in its open position, the shackle 120 is received in the housing 110, and the wheel is free to rotate. The shackle 120 includes a closed position notch 126 operable to be engaged by the lock mechanism 140 when the shackle 120 is in its closed position to thereby retain the shackle 120 in its closed position. In the illustrated form, the shackle 120 further includes an open position notch 128 operable to be engaged by the lock mechanism 140 when the shackle 120 is in its open position to thereby retain the shackle 120 in its open position. The shackle 120 may be biased toward its open position, for example by a spring 102 connected between the shackle 120 and the housing 110.

The driver 130 is connected with the shackle 120, and facilitates manual manipulation of the shackle 120 between its open position and its closed position. The driver 130 generally includes a knob 132 mounted for movement along the arcuate path 116, and a rigid connector 134 extending between the knob 132 and the rear end portion 122 of the shackle 120. The knob 132 includes a pair of channels 133 that receive the lips 117 and thereby restrict the knob 132 to movement along the guide path 116. The connector 134 is generally arcuate, and includes a first end portion 135 that is coupled with the knob 132 and a second end portion 136 that is coupled with the rear end portion 122 of the shackle 120. In certain embodiments, the connector 134 may include a bend 137. As described herein, the connector 134 extends through an aperture 151 in the case 150 such that a slit in the case 150 is not required for coupling the knob 132 with the shackle 120.

The lock mechanism 140 is configured to selectively retain the shackle 120 in its closed position, and may further be operable to retain the shackle 120 in its open position. The lock mechanism 140 includes a lock core 142 and a latch 144 operable to selectively engage the shackle 120. More particularly, the latch 144 is operable to engage the closed position notch 126 when the shackle 120 is in its closed position, and may further be operable to engage the open position notch 128 when the shackle 120 is in its open position. The lock core 142 is operable to selectively retain the latch 144 in an extended position in which the latch 144 engages one of the notches 126, 128 of the shackle 120. The lock mechanism 140 has a locked state in which the lock mechanism 140 prevents movement of the shackle 120, and an unlocked state in which the lock mechanism 140 does not prevent movement of the shackle 120.

In certain forms, the lock core 142 may be provided in the form of a mechanical core. For example, the lock core 142 may include a lock cylinder operable by a key 149 and/or a mechanical combination lock. Additionally or alternatively, the lock core 142 may include electronic features that facilitate the transition of the lock mechanism 140 between its locked and unlocked states. For example, the lock core 142 may include a credential reader and/or a wireless communication device operable to communicate with an external device. A credential reader may, by way of illustration, include a biometric credential reader operable to read biometric credentials, a card reader operable to read a credential embodied in tangible form, and/or a keypad operable to receive credential input. A wireless communication device may, for example, be configured to communicate with an external device via Bluetooth (e.g., Bluetooth Low Energy), WiFi, Zigbee, and/or another wireless communication protocol.

Figure 4:
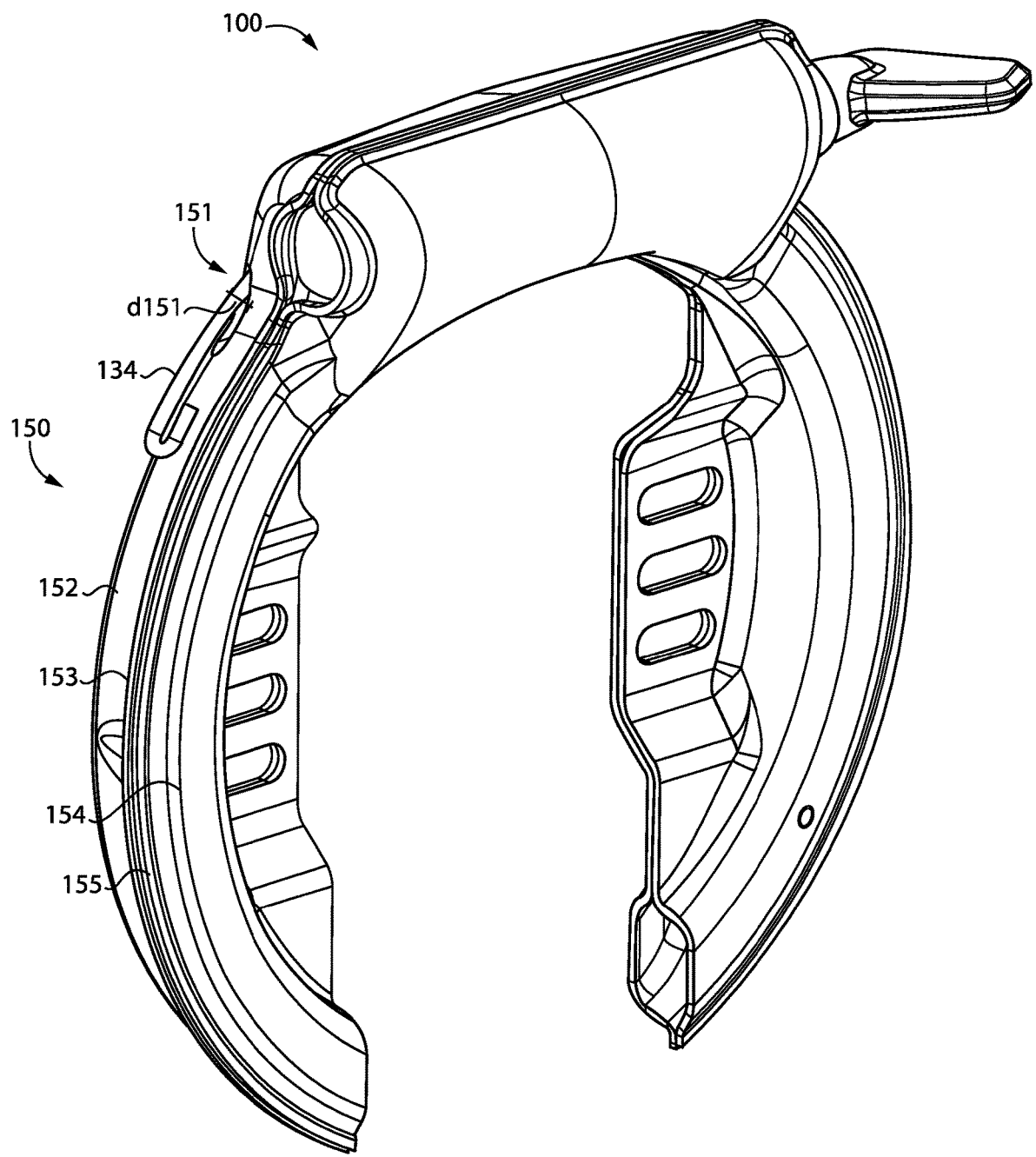
FIG. 4 is a perspective illustration of the ring lock with certain components removed to expose a case of the ring lock.

With additional reference to FIG. 4, illustrated therein is the ring lock 100 with certain components omitted to more clearly illustrate the case 150. The case 150 provides the majority of the structural strength for the housing 110, and may, for example, be formed of a metal material, such as steel. The case 150 includes an aperture 151 through which the connector 134 extends. The aperture 151 may, for example, have a maximum dimension d151 of one centimeter or less. The case 150 is generally formed of a first part 152 including a first flange 153 and a second part 154 including a second flange 155. The flanges 153, 155 are secured to one another and thereby retain the case 150 in its assembled state.

In certain embodiments, the flanges 153, 155 may be riveted to one another. In the illustrated form, however, the flanges 153, 155 are welded to one another. Those skilled in the art will readily appreciate that riveting the flanges to one another will often require that the flanges 153, 155 have a relatively large depth, such as a depth greater than one centimeter. Welding, by contrast, permits the flanges 153, 155 to have a relatively small depth, such as a depth of less than one centimeter. In certain embodiments, smaller flanges may be preferred over larger flanges for one or more reasons. By way of example, smaller flanges may discourage an attacker from prying the flanges apart with pliers, as the relatively small flanges hinder gripping of the flanges with the pliers. There is thus an unexpected synergy between welding and smaller flanges, the combination of which may render the ring lock more difficult to attack.

Figure 5:
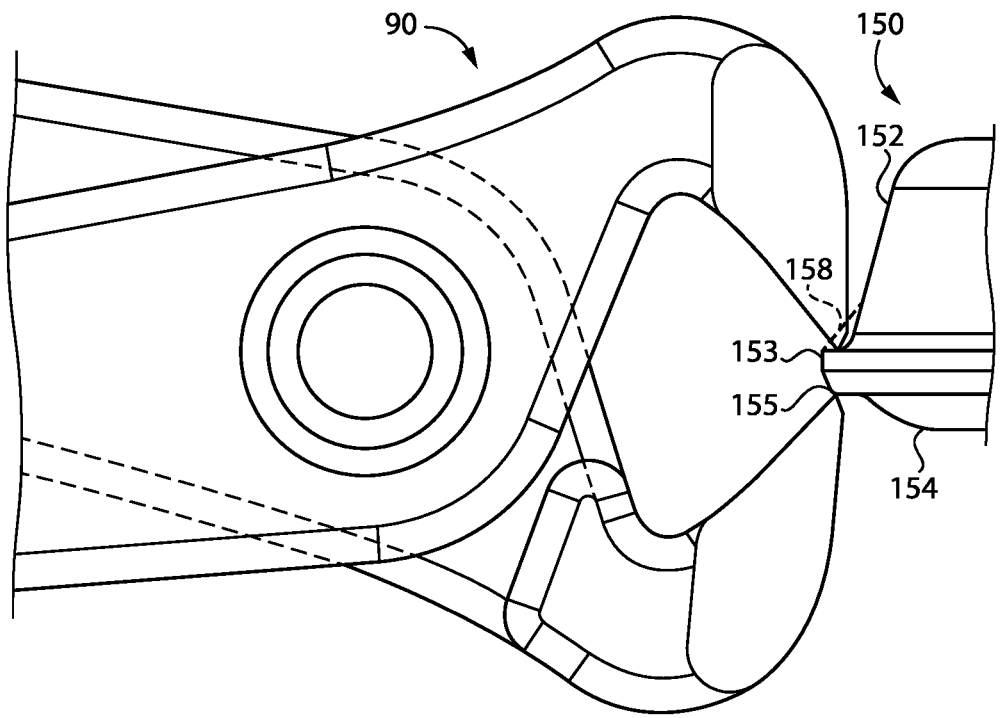
FIG. 5 illustrates a pair of pliers gripping a pair of flanges of the ring lock.
Figure 6:
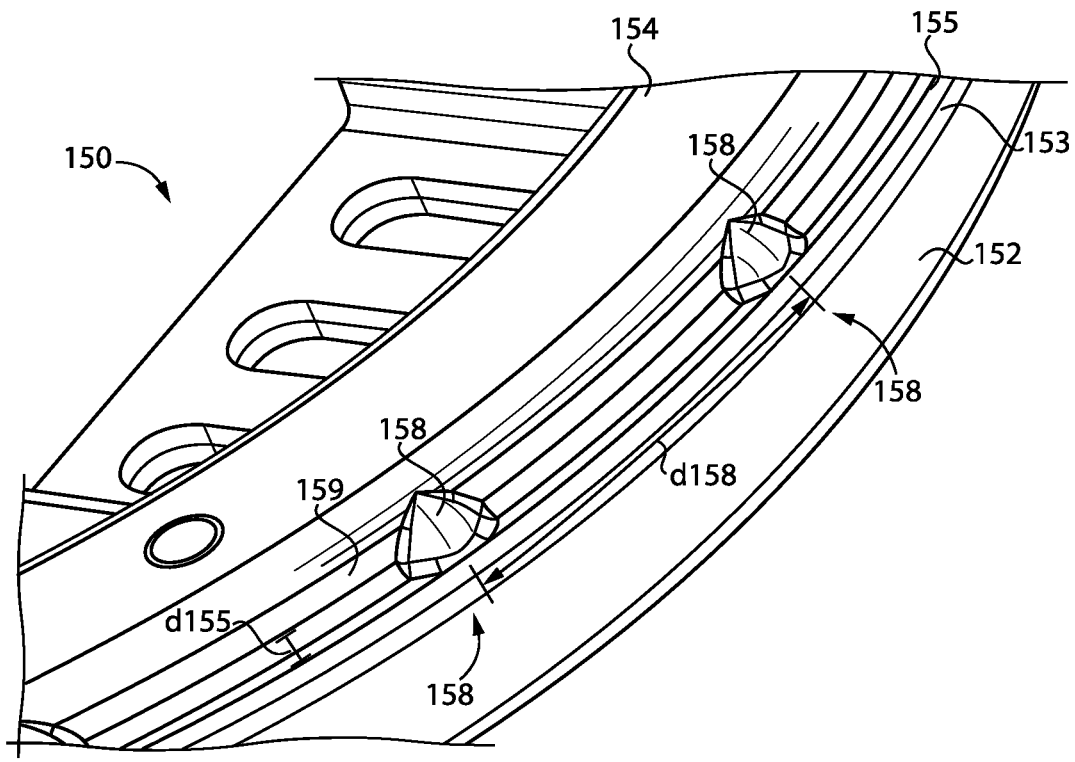
FIG. 6 is a perspective illustration of a portion of the ring lock, the illustrated portion including ramps.

With additional reference to FIGS. 5 and 6, one method of attempting to defeat the ring lock 100 may involve removing the outer housing 114 to expose the case 150, and attempting to pry the case parts 152, 154 from one another using a pair of pliers 90. One or more features of the case 150 may aid in defeating such an attack. As one example, the flanges 153, 155 may be of relatively small radial dimension (e.g., one centimeter or less), which may aid in discouraging the pliers 90 from finding purchase. For example, the second flange 155 may have a radial depth dimension d155 of one centimeter or less. In certain forms, the first flange 153 may likewise have a radial depth dimension of one centimeter or less. Those skilled in the art will readily recognize that a radial depth dimension may be measured in the radial direction, or transverse to the central axis about which the shackle 120 rotates.

In certain embodiments, the case 150 includes a plurality of ramps 158 that each slope along the corresponding and respective radial depth dimension d155 such that, when engaged by the pliers 90, urge the pliers off of the flanges 153, 155 to prevent or discourage the pliers 90 from gripping the flanges 153, 155. The ramps 158 may be distributed about a periphery of the case 150 such that at least one of the ramps 158 engages the pliers 90 regardless of the position of the pliers 90. The ramps 158 may be offset from one another by an offset dimension d158. In certain embodiments, the offset dimension d158 may be between 1 cm and 10 cm, or between 1 cm and 5 cm. Each ramp 158 extends from a sidewall 159 to an edge of the corresponding flange 153, 155, thereby preventing the pliers 90 from finding a solid grip point.

In the illustrated form, the case 150 includes a first plurality of ramps 158 formed on the first case portion 152 and a second plurality of ramps 158 formed on the second case portion 154 opposite the first plurality of ramps. It is also contemplated that the first ramps and the second ramps may be staggered, and that only one of the case portions 152, 154 may include ramps.

Certain embodiments of the present application relate to a ring lock, comprising: a case; a shackle movably mounted to the case; and a lock mechanism operable to selectively retain the shackle in a closed position; wherein the case comprises: a first case portion comprising a first flange; and a second case portion comprising a second flange; wherein each of the first flange and the second flange has a corresponding and respective radial depth dimension of one centimeter or less; and wherein the first flange and the second flange are welded to one another.

In certain embodiments, the case further comprises at least one ramp discouraging gripping of the first flange and/or the second flange.

In certain embodiments, the at least one ramp comprises a plurality of ramps.

In certain embodiments, the plurality of ramps are offset from one another by an offset distance in the range of one centimeter to five centimeters.

In certain embodiments, the at least one ramp comprises: a first ramp formed on the first flange; and a second ramp formed on the second flange.

In certain embodiments, the first ramp and the second ramp are positioned opposite one another.

In certain embodiments, the first ramp and the second ramp are offset from one another.

Certain embodiments of the present application relate to a ring lock, comprising: a case; a shackle movably mounted to the case; and a lock mechanism operable to selectively retain the shackle in a closed position; wherein the case comprises: a first case portion comprising a first flange; and a second case portion comprising a second flange welded to the first flange.

In certain embodiments, the first case portion further comprises a first plurality of ramps; wherein the second case portion further comprises a second plurality of ramps; and wherein each of the ramps is configured to discourage gripping of the corresponding case portion.

In certain embodiments, the first plurality of ramps are aligned with the second plurality of ramps.

In certain embodiments, the first plurality of ramps is positioned on the first flange; and wherein the second plurality of ramps is positioned on the second flange.

In certain embodiments, each ramp of the first plurality of ramps extends from a wall adjacent the first flange to an edge of the first flange.

In certain embodiments, the first plurality of ramps and the second plurality of ramps are offset from one another.

In certain embodiments, each of the first flange and the second flange has a corresponding and respective radial depth dimension of one centimeter or less.

In certain embodiments, the ring lock further comprises: an outer housing positioned about the case, the outer housing including a lip that at least partially defines a guide path; and an actuator operable to move the shackle between the closed position and an open position, the actuator comprising a knob including a channels; wherein the lip is received in the channel and limits the knob to movement along the guide path.

Certain embodiments of the present application relate to a ring lock, comprising: a case; a shackle movably mounted to the case; and a lock mechanism operable to selectively retain the shackle in a closed position; wherein the case comprises: a first case portion comprising a first flange; and a second case portion comprising a second flange secured to the first flange; and wherein each of the first flange and the second flange has a corresponding and respective radial depth dimension of one centimeter or less.

In certain embodiments, the first flange and the second flange are secured to one another by welding.

In certain embodiments, the first flange includes at least one ramp; and wherein the second flange includes at least one additional ramp.

In certain embodiments, the case further comprises an arcuate wall and a flange extending from the arcuate wall; and wherein a ramp extends outward from the wall along the flange.

In certain embodiments, the ramp extends to an edge of the flange.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A ring lock, comprising:
 a case;
 a shackle movably mounted to the case; and
 a lock mechanism operable to selectively retain the shackle in a closed position;
 wherein the case comprises:
  a first case portion comprising a first flange;
  a second case portion comprising a second flange; and
  at least one ramp on at least one of the first flange or the second flange;
 wherein each of the first flange and the second flange has a corresponding and respective radial depth dimension; and
 wherein the at least one ramp slopes along the corresponding and respective radial depth dimension to discourage gripping.

2. The ring lock of claim 1, wherein the case further comprises the at least one ramp on each of the first flange and the second flange to discourage gripping of the first flange and the second flange.

3. The ring lock of claim 1, wherein the at least one ramp comprises a plurality of ramps that each slope along the corresponding and respective radial depth dimension.

4. The ring lock of claim 1, wherein the at least one ramp comprises:
a first ramp formed on the first flange; and
a second ramp formed on the second flange; and
wherein the first ramp and the second ramp each slope along the corresponding and respective radial depth dimension.

5. The ring lock of claim 4, wherein the first ramp and the second ramp are positioned opposite one another.

6. The ring lock of claim 4, wherein the first ramp and the second ramp are offset from one another.

7. The ring lock of claim 1, wherein the corresponding and respective radial depth dimension is one centimeter or less.

8. The ring lock of claim 1, wherein the first flange and the second flange are welded to one another.

9. A ring lock, comprising:
a case;
a shackle movably mounted to the case; and
a lock mechanism operable to selectively retain the shackle in a closed position;
wherein the case comprises:
a first case portion comprising a first flange; and
a second case portion comprising a second flange; and
wherein each of the first flange and the second flange has a corresponding and respective radial depth dimension with at least one of the first flange or the second flange sloped along the corresponding and respective radial depth dimension to discourage gripping.

10. The ring lock of claim 9, wherein the first flange further comprises a first plurality of ramps;
wherein the second flange further comprises a second plurality of ramps; and
wherein each of the first and second plurality of ramps slopes along the corresponding and respective radial depth dimension to discourage gripping of the first flange and the second flange.

11. The ring lock of claim 10, wherein the first plurality of ramps is aligned with the second plurality of ramps.

12. The ring lock of claim 10, wherein each ramp of the first plurality of ramps extends from a wall adjacent the first flange to an edge of the first flange.

13. The ring lock of claim 10, wherein the first plurality of ramps and the second plurality of ramps are offset from one another.

14. The ring lock of claim 9, wherein the corresponding and respective radial depth dimension is one centimeter or less.

15. The ring lock of claim 9, further comprising:
an outer housing positioned about the case, the outer housing including a lip that at least partially defines a guide path; and
an actuator operable to move the shackle between the closed position and an open position, the actuator comprising a knob including a channels; and
wherein the lip is received in the channel and limits the knob to movement along the guide path.

16. A ring lock, comprising:
a case;
a shackle movably mounted to the case; and
a lock mechanism operable to selectively retain the shackle in a closed position;
wherein the case comprises:
a first case portion comprising a first flange; and
a second case portion comprising a second flange secured to the first flange; and
wherein each of the first flange and the second flange has a corresponding and respective radial depth dimension; and
wherein at least one of the first flange or the second flange is sloped along the corresponding and respective radial depth dimension to discourage gripping.

17. The ring lock of claim 16, wherein the first flange and the second flange are secured to one another by welding.

18. The ring lock of claim 16, wherein the first flange includes at least one ramp; and
wherein the second flange includes at least one additional ramp; and
wherein the at least one ramp and the at least one additional ramp are sloped along the corresponding and respective radial depth dimension to discourage gripping of the first flange and the second flange.

19. A ring lock, comprising:
a case;
a shackle movably mounted to the case; and
a lock mechanism operable to selectively retain the shackle in a closed position;
wherein the case comprises:
a first case portion comprising a first flange; and
a second case portion comprising a second flange secured to the first flange;
wherein each of the first flange and the second flange has a corresponding and respective radial depth dimension of one centimeter or less;
wherein the case further comprises an arcuate wall and a flange extending from the arcuate wall; and
wherein a ramp extends outward from the wall along the flange.

20. The ring lock of claim 19, wherein the ramp extends to an edge of the flange.

* * * * *